United States Patent
Anderson et al.

(10) Patent No.: US 10,801,216 B1
(45) Date of Patent: Oct. 13, 2020

(54) SYSTEM FOR DISTRIBUTING WIRELESS NETWORKING COMPONENTS IN A VENUE

(71) Applicant: MSG Sports and Entertainment, LLC, New York, NY (US)

(72) Inventors: Robert Anderson, Levittown, NY (US); Erik Hockman, New York, NY (US)

(73) Assignee: MSG Sports and Entertainment, LLC, New York, NY (US)

( * ) Notice: Subject to any disclaimer, the term of this patent is extended or adjusted under 35 U.S.C. 154(b) by 0 days.

(21) Appl. No.: 16/417,352

(22) Filed: May 20, 2019

(51) Int. Cl.
*E04F 15/02* (2006.01)
*E04H 3/30* (2006.01)
*E04F 15/024* (2006.01)

(52) U.S. Cl.
CPC .. *E04F 15/02447* (2013.01); *E04F 15/02435* (2013.01); *E04H 3/30* (2013.01); *E04F 15/02038* (2013.01)

(58) Field of Classification Search
CPC .......... E04F 15/02447; E04F 15/02435; E04F 15/02038; E04H 3/30
USPC ....................................................... 52/220.2
See application file for complete search history.

(56) References Cited

U.S. PATENT DOCUMENTS

| | | | | |
|---|---|---|---|---|
| 3,643,389 A * | 2/1972 | Sheppley, Jr. | ............ | E04B 5/48 52/79.1 |
| 4,554,771 A * | 11/1985 | Marwah | ................. | H02G 3/283 174/486 |
| 4,686,381 A * | 8/1987 | Boteler | .................. | H02G 3/281 174/491 |
| 5,263,289 A * | 11/1993 | Boyd | ................ | E04F 15/02494 52/220.2 |
| 5,350,884 A * | 9/1994 | Littrell | ................... | H02G 3/185 174/489 |
| 5,842,313 A * | 12/1998 | Murray | ..................... | H02G 3/00 52/220.6 |
| 5,904,015 A * | 5/1999 | Chen | ................. | E04F 15/02494 52/220.2 |
| 5,911,661 A * | 6/1999 | Murray | .................. | E04B 9/003 174/491 |
| 5,992,108 A * | 11/1999 | Falcey | ...................... | E04B 5/48 52/126.6 |
| 6,178,895 B1 * | 1/2001 | Saxton | ................... | B61D 17/10 105/396 |
| 6,550,195 B1 * | 4/2003 | Cooper | ..................... | E04B 5/48 52/126.3 |
| 6,604,993 B1 * | 8/2003 | Boniface | ........... | E04F 15/02458 165/168 |

(Continued)

OTHER PUBLICATIONS

International Search Report and Written Opinion of the International Searching Authority in International Application No. PCT/US2020/033744, dated Jun. 18, 2020 (10 pages).

*Primary Examiner* — Jeanette E Chapman
(74) *Attorney, Agent, or Firm* — Sterne, Kessler, Goldstein & Fox, P.L.L.C.

(57) ABSTRACT

A system for distributing wireless networking components in a venue. The system includes panels that define a floor surface. The panels each have a planar configuration with an upper surface opposite a lower surface. The panels include a material that is transparent to radio waves, and the panels define a storage space below the panels and the storage space may be used to store and distribute wireless networking component.

19 Claims, 11 Drawing Sheets

(56) References Cited

U.S. PATENT DOCUMENTS

| | | | | |
|---|---|---|---|---|
| 6,702,510 | B2* | 3/2004 | Barker | H02G 9/04 |
| | | | | 404/3 |
| 6,865,851 | B2* | 3/2005 | Stempinski | H02G 3/385 |
| | | | | 52/126.2 |
| 7,205,488 | B2* | 4/2007 | Riner | H02G 3/185 |
| | | | | 174/481 |
| RE40,069 | E* | 2/2008 | Cole | 174/481 |
| 7,481,029 | B2* | 1/2009 | McQuilken | H02G 3/185 |
| | | | | 174/486 |
| 7,795,533 | B2* | 9/2010 | Bravo | H02G 3/16 |
| | | | | 174/50 |
| 8,955,955 | B2* | 2/2015 | Mimura | B41J 2/2114 |
| | | | | 347/100 |
| 9,674,435 | B1* | 6/2017 | Monari | H04N 13/243 |
| | | | | 13/243 |
| 9,879,434 | B2* | 1/2018 | Boyd | H02G 3/385 |
| 10,433,453 | B2* | 10/2019 | Franz | H05K 7/1488 |
| 10,465,410 | B2* | 11/2019 | Villman | H01Q 1/1242 |
| 10,608,315 | B2* | 3/2020 | Anolik | H01Q 1/007 |
| 2002/0157331 | A1* | 10/2002 | Peart | E04F 15/02411 |
| | | | | 52/220.2 |
| 2008/0302033 | A1* | 12/2008 | Insalaco | B66C 7/04 |
| | | | | 52/220.2 |
| 2009/0230827 | A1* | 9/2009 | MacAll | H05K 5/0204 |
| | | | | 312/223.1 |
| 2010/0038129 | A1* | 2/2010 | Handler | H02G 3/0418 |
| | | | | 174/481 |

* cited by examiner

SYSTEM FOR DISTRIBUTING WIRELESS NETWORKING COMPONENTS IN A VENUE

FIELD

Embodiments described herein generally relate to systems for distributing wireless networking components in a venue. Specifically, embodiments described herein relate to systems that include a plurality of panels composed of a material that is transparent to radio waves and that defines a storage area for wireless networking components below the panels.

BACKGROUND

Stadiums, theaters, concert halls, arenas, and other venues are constructed to include various electrical and telecommunications infrastructure to provide electricity and telecommunications services in various locations throughout the venue. Such venues also provide wireless access points to provide wireless internet access within the venue. However, many venues are constructed with wireless access points and other electrical or telecommunications infrastructure integrated in the structure of the venue, such that these components are not readily accessed or relocated. As a result of the built-in infrastructure, components are in fixed positions and may not be conveniently located for use by staff and patrons. Further venues may be unable to update such components to keep up with changing technology standards, or may be able to do so only with considerable time, effort and expense.

Therefore, a system for distributing wireless networking components is desired that provides wireless networking components in desired locations in the venue and that provides access to the components, such as for maintenance, repair, and replacement.

BRIEF SUMMARY OF THE INVENTION

The following presents a simplified summary of the present disclosure in order to provide a basic understanding of some aspects described herein. This summary is not an extensive overview and is not intended to identify key or critical elements or to delineate the scope of the claims. The following summary merely presents various described aspects in a simplified form as a prelude to the more detail description below.

Some embodiments described herein relate to a system for distributing wireless networking components in a venue includes a plurality of panels defining a floor surface, wherein a first panel of the plurality of panels has a planar configuration with an upper surface opposite a lower surface, wherein the first panel comprises a material that is transparent to radio waves, and a storage space defined below the panel configured to store a wireless networking component.

Some embodiments described herein relate to flooring system for use with a pre-existing support structure that includes a plurality of panels defining a floor surface, wherein a first panel of the plurality of panels has a planar configuration with an upper surface opposite a lower surface, wherein the first panel comprises a material that is transparent to radio waves, and wherein the first panel comprises a recess on the lower surface of the first panel that is arranged symmetrically relative to an axis of the first panel, and a storage space defined below the panel configured to store a wireless networking component.

Some embodiments described herein relate to flooring system for use with a pre-existing support structure that includes a plurality of panels defining a floor surface that is continuous with a surface of a pre-existing support structure, wherein a first panel of the plurality of panels has a planar configuration with an upper surface opposite a lower surface, wherein the first panel comprises a first material that is transparent to radio waves, and a trench defining a storage space for a wireless networking component, wherein the upper end of the trench is configured to removably receive the plurality of panels.

In any of the various embodiments described herein, the material of the first panel may include a fiber reinforced polymer.

In any of the various embodiments described herein, the first panel may include a recess on the lower surface of the first panel, such that a thickness of the first panel at the recess is less than a thickness of a remainder of the first panel.

In any of the various embodiments described herein, the first panel may include a reinforcement. In some embodiments, the reinforcement may include a metal bar. In some embodiments, the reinforcement may include a frame positioned at a perimeter of the first panel.

In any of the various embodiments described herein, the first panel may include a dovetail at a perimeter of the first panel configured to connect the first panel to a second panel of the plurality of panels.

In any of the various embodiments described herein, the first panel may include a seal disposed around a perimeter of the first panel.

In any of the various embodiments described herein, the plurality of panels may be positioned in an edge-to-edge manner in a single plane.

In any of the various embodiments described herein, the first panel may include a cutout to allow a cable to pass through the first panel from the storage space to an area above the first panel.

In any of the various embodiments described herein, the first panel may be configured to withstand a weight of at least 15,000 lbs.

In any of the various embodiments described herein, the system may further include a riser that is removably securable to the lower surface of the first panel of the plurality of panels, wherein the riser is configured to support the first panel in an elevated position relative to a support surface so as to define a storage space below the first panel. In some embodiments, the first panel may have a square or rectangular shape, and the riser may be one of a number of risers removably secured to a lower surface of the first panel.

In any of the various embodiments described herein that include a trench, the trench may be embedded in the support structure.

In any of the various embodiments described herein that includes a trench, when the first panel is received by the trench, the upper surface of the first panel may be coplanar with the surface of the support structure.

In any of the various embodiments described herein that includes a trench, the trench may include a base, a first upstanding sidewall extending from the base, and a second upstanding sidewall extending from the base, such that the storage space is defined between the first and second upstanding sidewalls. In some embodiments, an upper end of each of the first and second upstanding sidewalls may include a notch configured to receive a portion of the first panel.

In any of the various embodiments described herein that includes a trench, the trench further includes a partition configured to divide the storage space into a first storage space and a second storage space.

The summary here is not an exhaustive listing of the novel features described herein, and are not limiting of the claims. These and other features are described in greater detail below.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
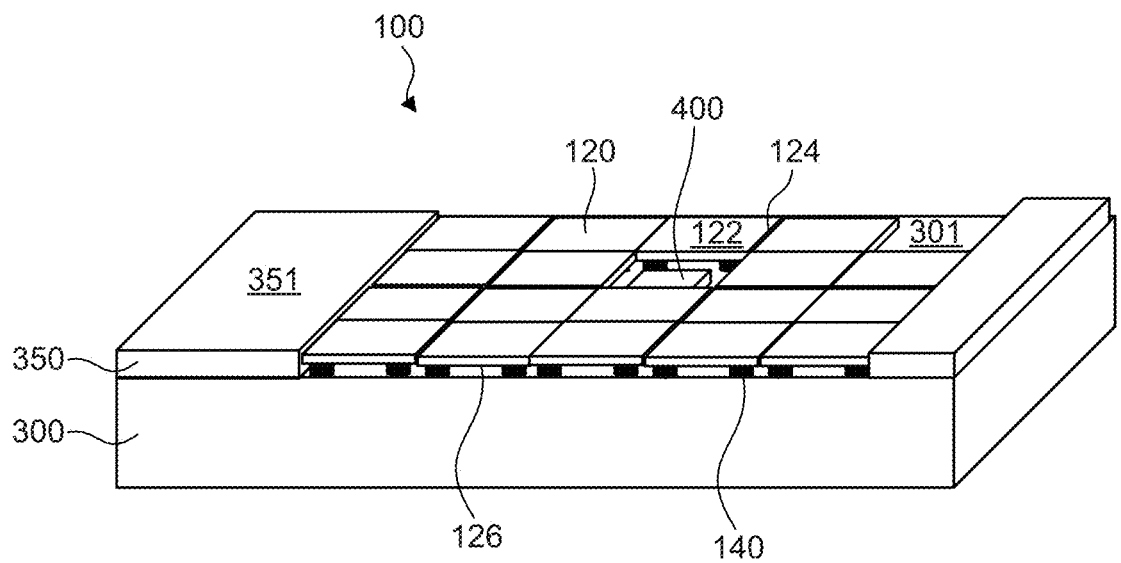
FIG. 1 shows a perspective view of a distribution system including a plurality of panels and a pre-existing support structure according to an embodiment.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Wireless access points are critical for operation of a venue for management of show equipment as well as for production and coordination. Further, robust wireless connectivity for patrons is a fundamental need in modern venues, such as stadiums, theaters, concert halls, ballparks, amphitheaters, and arenas, among other venues. Patrons demand fast and reliable internet connections so that they may use their cell phones and or mobile electronic devices while inside of the venue, for example to share their experiences online. However, typical mounting locations for wireless access points in a venue may be too distant from users or may be blocked by intervening structures of the arena. As a result, the wireless access points may have poor coverage and performance. Further, if wireless access points and other telecommunications infrastructure are built-into the structure of the venue, and are fixed in position or are hard to access, it may be difficult or impossible to replace or upgrade the telecommunications infrastructure, or the infrastructure may only be able to be replaced with considerable renovation and expense.

Further, electrical connections may be required at various locations within a venue, such as at a temporary stage. As a conventional floor of a venue does not include electrical connections, cables may have to be run along the floor from a remote electrical outlet or power source. Thus, it can be inconvenient to provide electrical connections in the desired locations, and the cables may be unsightly and may create a tripping hazard.

Some embodiments described herein relate to a flooring system that includes a plurality of panels that define a storage area below the panels. In this way, cables and other wireless networking components can be easily stored and positioned at desired locations throughout a venue or arena below the floor surface defined by the panels. Further, the panels are removably positioned, the panels can be removed to access the cables and wireless networking components in the storage area, such as for maintenance, repair, or replacement of the wireless networking components.

As used herein, the term "wireless networking components" may refer to any cable, network, or wireless components, such as electrical cables and equipment, telecommunications cables and equipment, and wireless access points, such as Wi-Fi radios, Bluetooth beacons, or in building-cellular systems, among other components for providing electricity and telecommunications throughout the venue.

A radio wave transparent or radio-frequency ("RF") transparent material may refer to a material that allows wireless signals to pass therethrough with little to no alteration of the amplitude and/or phase of the signal, and which may have a low dielectric loss factor.

Some embodiments described herein relate to a distribution system 100 that includes a plurality of panels 120 comprising radio wave transparent materials. In embodiments, the plurality of panels 120 define a flat, continuous floor surface and define a storage area 150 below panels 120 for storage and distribution of wireless networking components. Plurality of panels 120 may be supported above a pre-existing support structure 300, such as a floor of a venue, by use of risers 140, or in some embodiments, trenches 240 may define a storage area 250 below panels 220 and trenches 240 are embedded in support structure 300 with panels 220 covering trenches 240 and being level with a surface 301 of support structure 300 such that panels 220 and support structure 300 together define a floor surface suitable for use in a venue.

Figure 2:
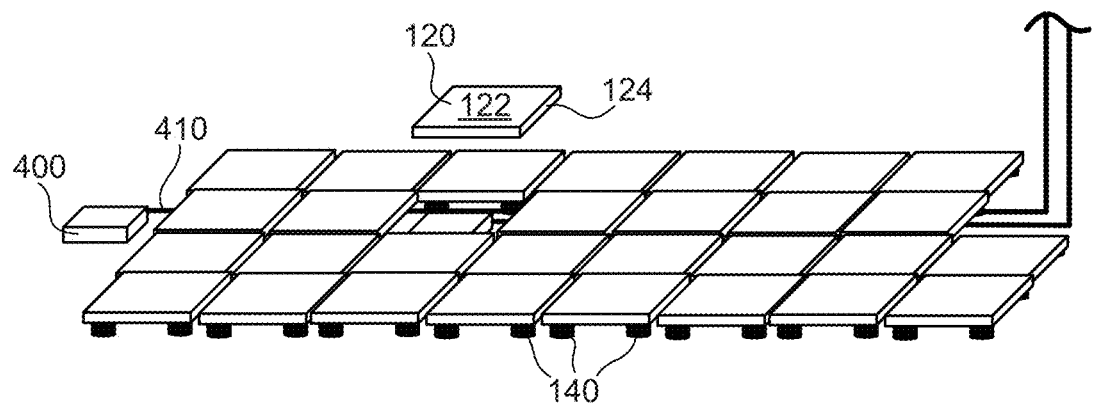
FIG. 2 shows a perspective view of a distribution system including a plurality of panels according to an embodiment.

In some embodiments, a distribution system 100 includes a plurality of panels 120, as shown for example in FIGS. 1 and 2. Each panel 120 may be planar in configuration. Panels 120 can be arranged in a single plane so as to form a floor surface 122, 351. Panels 120 may be placed side-by-side and in an edge-to-edge manner so as to form a flat, continuous surface with no gaps or spaces. Panels 120 may have a surface 122 that is smooth and is free of ridges, channels or the like. Panels 120 may be arranged in a single row, or in multiple rows so as to be arranged in a grid. In some embodiments, one or more panels 120 may have a curved upper surface such that a plurality of panels defines a continuous curved floor surface 122, 351.

In some embodiments, each panel 120 may have the same shape and dimensions. However, in alternate embodiments, some panels 120 may differ in size, shape, or both. Each panel 120 may have a square shape, or may have a triangular, rectangular, diamond, pentagon, hexagon, or other geometric shape. For example, some panels 120 may have a square shape, while other panels have a rectangular shape. Panels 120 having a rectangular shape may be the size of two panels 120 having a square shape arranged in a side-by-side manner.

In some embodiments each panel 120 has a length of about 10 to about 50 inches and a width of about 10 to about 50 inches, or may have a length of about 12 to about 40 inches and a width of about 12 to about 40 inches. In some embodiments, each panel 120 has a thickness of about 1 inch to about 6 inches, or about 2 inches to about 5 inches, and in some embodiments each panel may have a thickness of about 3 inches. Panels 120 may be constructed so as to have the smallest thickness possible in order to improve radio wave transparency while maintaining sufficient structural properties to support heavy loads. Further, a small thickness may help to ensure that panels 120 are lightweight and to minimize the amount of material used to construct each panel 120.

Each panel 120 includes a radio wave transparent material. Panel 120 may be composed entirely of a radio wave transparent material or a portion thereof may include a radio wave transparent material. In some embodiments, the radio wave transparent material is a fiber reinforced polymer, such as fiberglass. Materials used to form panels 120 may be lightweight so that each panel 120 can be moved and installed by a single person, facilitating installation of a flooring system 100 incorporating panels 120. Thus, in some embodiments, each panel 120 may have a weight of about 50 lbs or less, 40 lbs or less, or 30 lbs or less.

Figure 3:
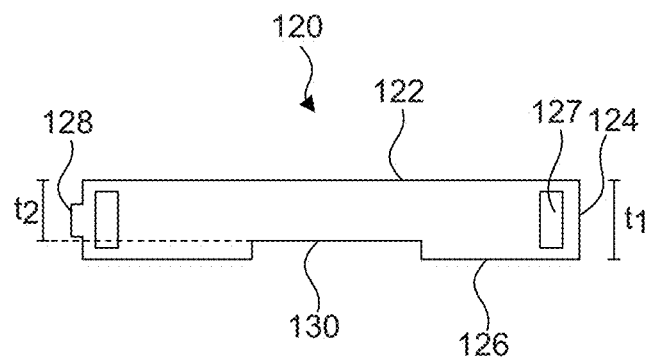
FIG. 3 shows a cross sectional view of a panel of a distribution system according to an embodiment.

In some embodiments, panel 120 further includes a reinforcement 127, as shown in FIG. 3. Reinforcement 127 is configured to provide additional structural support and stability to panel 120 so that panel 120 may support heavy loads thereon, such as the weight of a forklift or other machinery or equipment. In some embodiments, each panel 120 may be configured to support a load of about 10,000 lbs or more, 12,500 lbs or more, or 15,000 lbs or more, while maintaining radio wave transparency. In certain embodiments, reinforcement 127 may comprise a metal rod or bar. Reinforcement 127 may be positioned at an edge or along a perimeter 124 of panel 120. In some embodiments, reinforcement 127 may be positioned on a portion of perimeter 124 of panel 120 or may extend entirely around perimeter 124 so as to form a frame.

Figure 4:
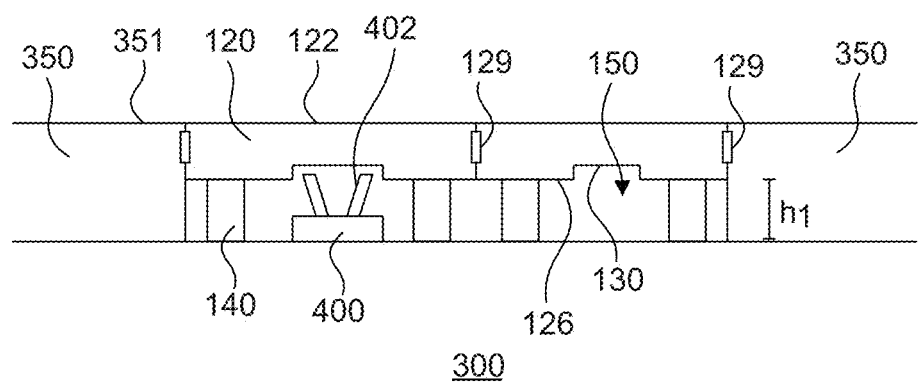
FIG. 4 shows a cross sectional view of a distribution system according to an embodiment.

In some embodiments, a perimeter 124 of panel 120 may include a seal or gasket 129, as shown in FIG. 4. Seal 129 may include any of various elastomeric materials, including but not limited to ethylene propylene diene monomer (EPDM), acrylonitrile butadiene styrene (ABS), silicone, or nitrile. When a plurality of panels 120 are positioned in an edge-to-edge manner to form a floor surface, seal 129 may help to prevent liquids on upper surface of panels 120 from flowing between panels 120 and into an area below panels 120. This helps to protect the cables and wireless networking components in storage area 150.

In some embodiments, each panel 120 may be configured to mate with one or more additional panels 120. Each panel 120 may include a dovetail 128 at a perimeter edge 124 configured to engage with a perimeter edge 124 of an additional panel 120 (see FIG. 3). This may help to ensure proper alignment and positioning of panels 120 with respect to one another while allowing panels 120 to be individually removed and installed.

Figure 5A:
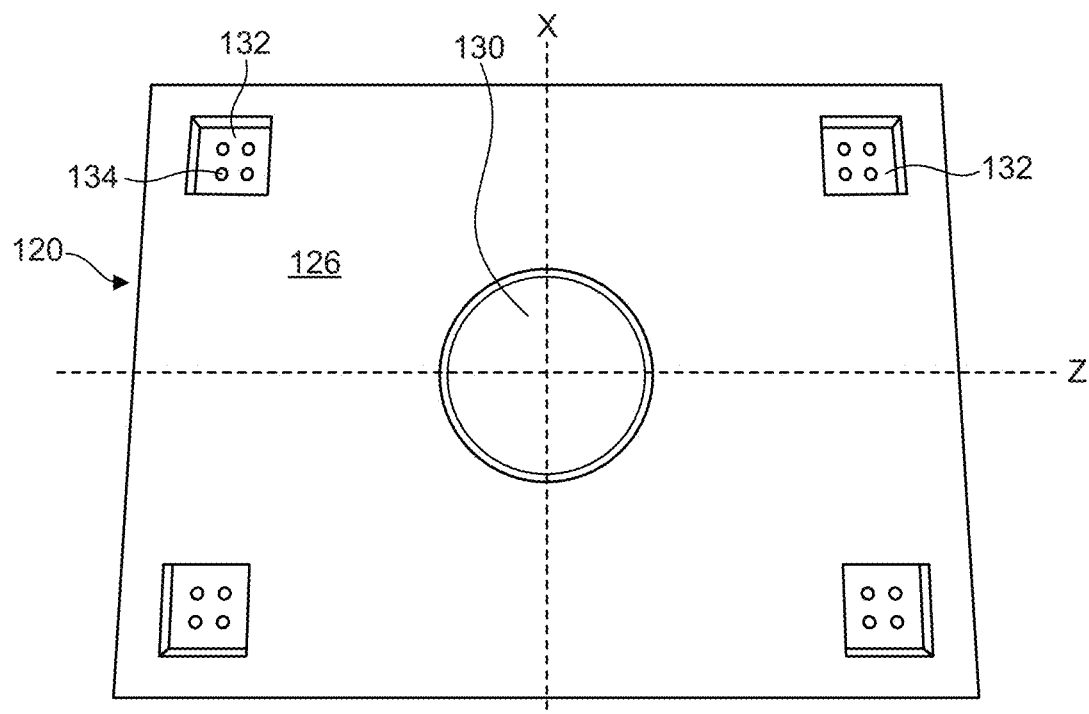
FIG. 5A shows an isometric view of a lower surface of a panel of a distribution system according to an embodiment.

In some embodiments, a recess 130 may be formed on a lower surface 126 of panel 120, as shown in FIG. 5A. Recess 130 is shown as having a circular shape and is positioned centrally on lower surface 126 of panel 120. Recess 130 may be shaped and positioned such that recess 130 is symmetric about an axis of panel 120, such as a longitudinal axis X or transverse axis Z, or both. Forming panels 120 that are symmetric about the X- and Z-axes facilitates installation, removal and maintenance, as panels 120 can be placed in any orientation and do not need to be rotated into a particular orientation before being placed. However, in other embodiments, recess 130 may be any of various shapes, such as a square, rectangular, or oval shape. In alternate embodiments, recess 130 may be positioned off-center, such as toward a perimeter edge 124 of panel 120 on lower surface 126.

Panel 120 has a thickness $t_1$ as measured from upper surface 122 to lower surface 126 of panel 120, and a thickness $t_2$ of panel 120 at recess 130 may be less than the thickness $t_1$ of a remainder of panel 120, as shown in FIG. 3. The reduced thickness at recess 130 may facilitate transmission of a radio wave signal through panel 120. Further, recess 130 may provide additional space in storage area 150 to accommodate wireless networking components 400, such as an antenna 402 of a wireless networking component 400, as shown in FIG. 4.

Figure 6:
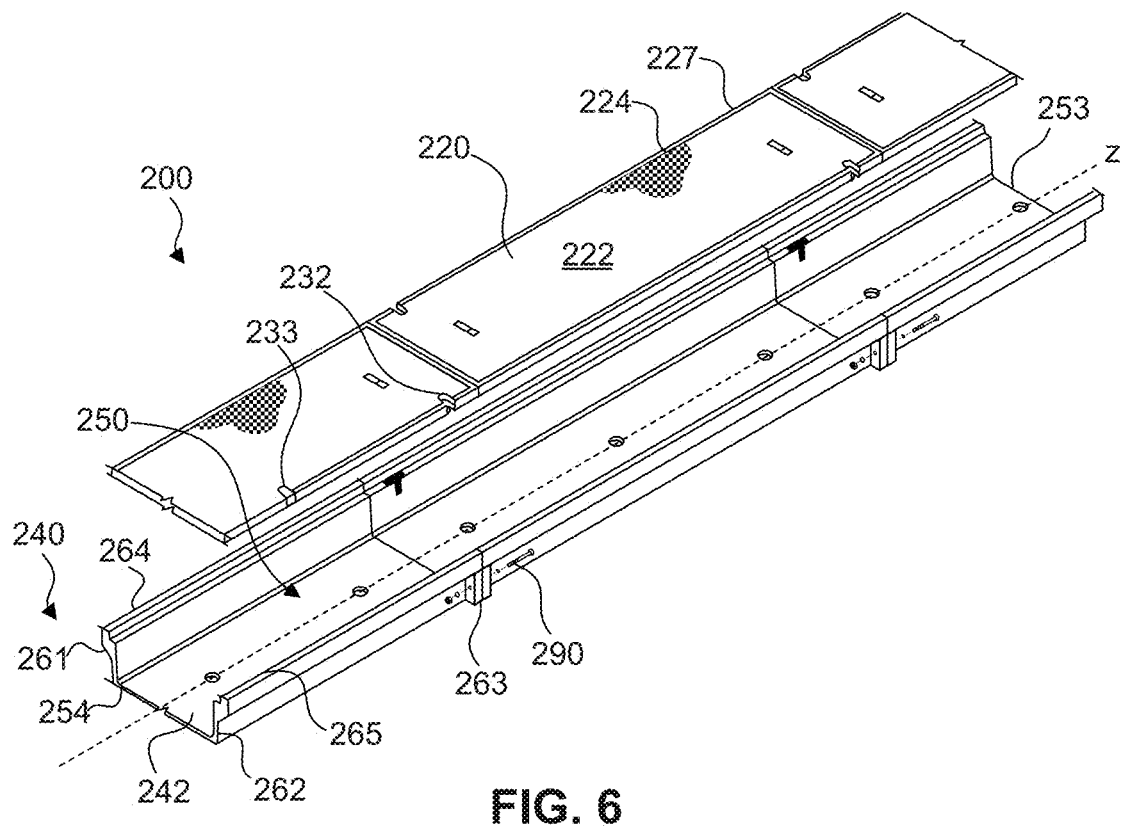
FIG. 6 shows a perspective view of a distribution system including a plurality of panels and a trench according to an embodiment.

In some embodiments, a panel 220 as shown for example in FIG. 6, may further include a cutout 232 that allows a cable or other wireless networking components 400 to pass from storage area 250 to an area above panels 220. In this way, a cable can extend under plurality of panels 220 in storage area 250 and can extend through cutout 232 to provide cables to a desired location in venue without running cables along upper surface 222 of panels 220. When not in use, cutout 232 may be removably covered by a plug or stopper 233. Further, cutout 232 may facilitate removal of panel 220 by providing a location of panel 220 to grasp by hand or with a tool.

Figure 5B:
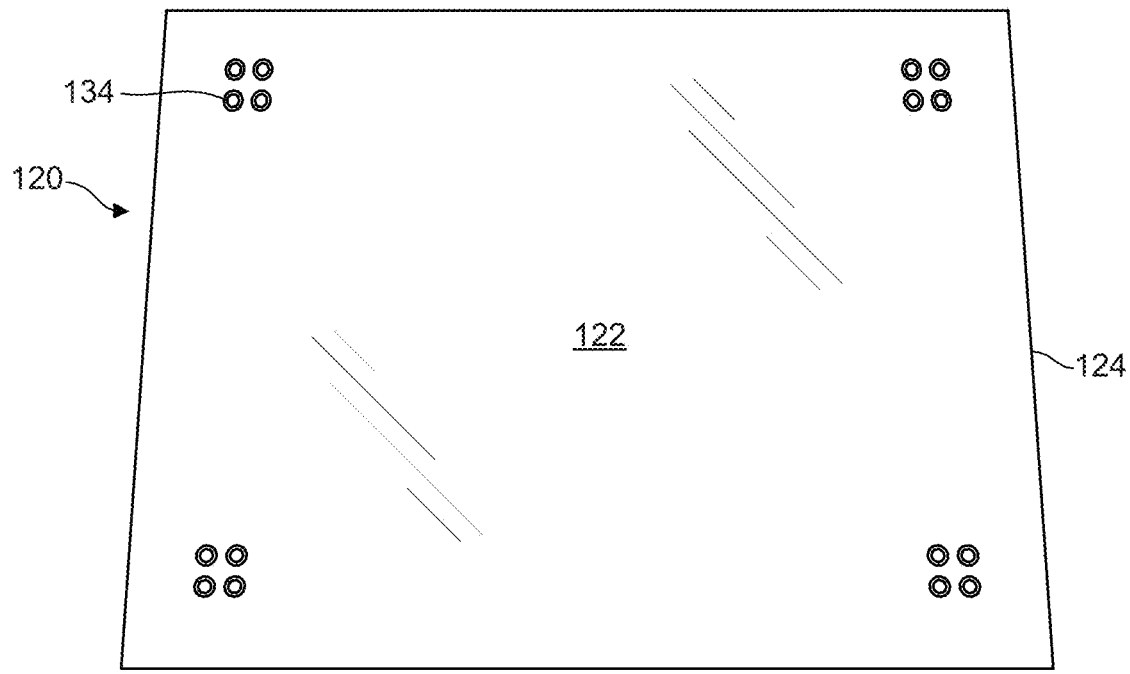
FIG. 5B shows an isometric view of an upper surface of the panel of FIG. 5A.
Figure 5C:
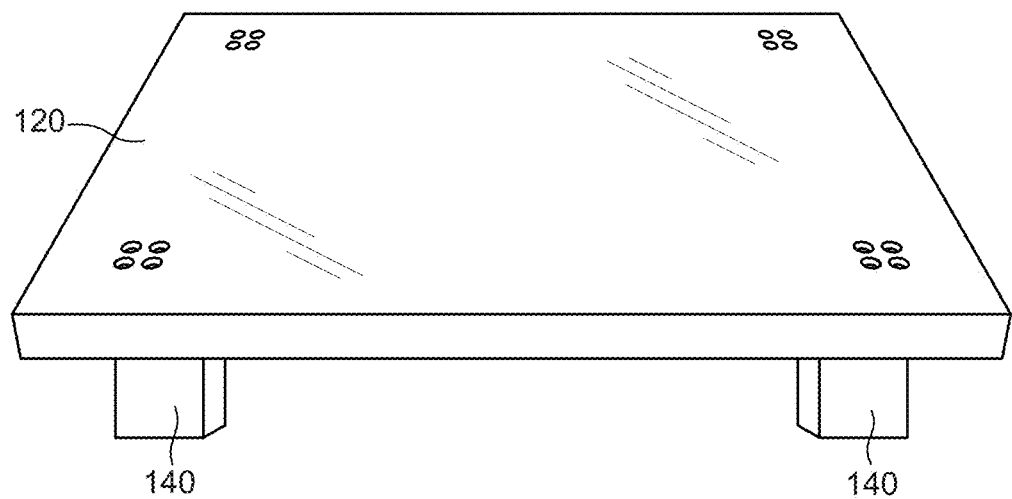
FIG. 5C shows a perspective view of a panel of FIG. 5A having risers according to an embodiment.

In some embodiments, each panel 120 may be supported by one or more risers 140, as shown in FIGS. 4 and 5C. Risers 140 may be connected to panels 120 so as to support panels 120 in an elevated position relative to a surface 301 of a support structure 300, such as a floor of a venue, such that storage area 150 is defined below panel 120 and above support surface 301, as best shown in FIG. 4. Each riser 140 may have a transverse cross sectional area that is a square or rectangular, such that each riser 140 has a block shape, or may have a circular transverse cross sectional area such that each riser 140 is cylindrical, or risers 140 may be formed with any of various cross sectional shapes. In some embodiments, riser 140 may be configured to position panels 120 such that a lower surface 126 of panel 120 is at a height $h_1$ of up to about 15 inches above surface 301 of support structure 300, or up to about 12 inches above surface 301, or up to about 10 inches above surface 301.

Risers 140 may be connected to a lower surface 126 of panel 120. Risers 140 may be connected adjacent a perimeter 124 of panel 120. In some embodiments, a riser 140 may be positioned at each corner of panel 120. In an alternate embodiment, risers 140 may further be positioned at intermediate positions between corners of panel 120. However, the use of the least number of risers 140 to stably support panel 120 may facilitate construction and installation of floor system 100.

In some embodiments, panel 120 may define one or more apertures 134 (see FIG. 5B) configured to receive mechanical fasteners for securing panel 120 to each riser 140. Mechanical fasteners may include nails, bolts, screws, or the like. In alternate embodiments, risers 140 may be secured to panel 120 via bonding, welding, glue, or adhesives. In some embodiments, panel 120 may include receptacles 132 on lower surface 126 of panel 120 to receive a portion of riser 120, as shown in FIG. 5A. Receptacles 132 may help to securely position risers 140 with respect to panel 120. Riser 140 may be shaped with a transverse cross sectional area that is the same as a cross sectional shape of receptacle 132. For example, in FIG. 5A, riser 140 has a square cross sectional shape and receptacle 132 similarly includes a square cross sectional shape to receive riser 140.

In use, distribution system 100 is installed by arranging a plurality of panels 120 having risers 140 in a grid layout on a surface 301 of a support structure 300 such that risers 140 are in contact with surface 301 and panels 120 are elevated above surface 301 of support structure 300 so as to define a storage area 150 below panel 120 and above a pre-existing support structure 300 (see FIGS. 1 and 2). Panels 120 are positioned in an edge-to-edge manner so as to form a smooth, continuous surface with each panel 120 located in a single plane. As system 100 may be used to form only a portion of a floor of a venue or area, one or more slabs 350 may be positioned on surface 301 of a pre-existing support structure 300 and adjacent panels 120 (see FIG. 1). Slab 350 has a height that is the same as that of distribution system 100 so as to provide a continuous surface to transition from a surface 122 of panels 120 of system 100 to a surface 351 of an adjacent area. Slab 350 may include a solid block of material, such as prefabricated concrete, and may be a pre-existing structure.

Storage area 150 defined by panels 120 may be used to distribute cables 410 to a desired area of the venue or arena without cables 410 being exposed on a surface of the floor, as shown in FIG. 2. Further, wireless access points 400 can be positioned at any of various locations in storage area 150 below panels 120 so as to provide a wireless signal in a desired area. The wireless networking components may be accessed by removing a single panel 120 to access storage area 150 and components therein. Each panel 120 may be removed without moving or altering any other panel 120 of system 100. In this way, maintenance, repair and replacements can be made and a panel 120 can simply be replaced once the maintenance is complete.

Some embodiments described herein relate to a distribution system 200 that includes a plurality of panels 220 and further includes a trench 240, as shown in FIG. 6. Trench 240 defines a storage area 250 for storing and distributing any of various components, such as wireless networking components. In some embodiments, trench 240 includes a base 242, a first sidewall 261 extending from base 242, and a second sidewall 262 extending from base 242. In some embodiments, trench 240 is substantially linear and includes a longitudinal axis Z. However, trench 240 may be formed so as to have a curvilinear configuration, or may be formed with one or more bent or angled regions, such that trench 240 may have an L-shape or a T-shape, among other configurations. In some embodiments, trench 240 has a cross sectional area that may be square, rectangular, or trapezoidal. However, trench 240 may have any of various other desired cross sectional areas, and may be formed with a semi-circular or triangular cross sectional area.

Each trench 240 may include a first end 254 opposite a second end 253. Trench 240 may include a flange 263 extending outwardly from a sidewall 261, 262 of trench 240 at each of first end 254 and second end 253 in a direction transverse to longitudinal axis Z of trench 240. A flange 263 of a first trench 240 may be positioned in facing engagement with a flange 263 of a second trench 240. A fastener 290 may be inserted through flanges 263 of first and second trenches 240 to secure first trench 240 to second trench 240. Each flange 263 may include one or more apertures 269 for receiving a fastener therethrough to facilitate securement of trenches 240. When flanges 263 are placed in facing engagement apertures 269 on each flange 263 may be aligned so as to receive a fastener 290 therethrough. A mechanical fastener 290 may be inserted through an aperture 269 of each flange 263, such as a bolt, screw, rivet, or the like. In other embodiments, trenches 240 may be secured to one another such as by bonding, welding, adhesives, or the like.

Trench 240 may be partially or entirely composed of a radio wave transparent material. In this way, trench 240 does not block or alter a radio wave signal by a wireless access point stored within trench 240. Trench 240 may be composed of the same material as panel 220. In some embodiments, however, trench 240 may be composed of a different material than panel 220. The material may be a different radio wave transparent material. However, in some embodiments, trench 240 may be composed of a material such as a metal, including aluminum or stainless steel, among others.

Figure 7:
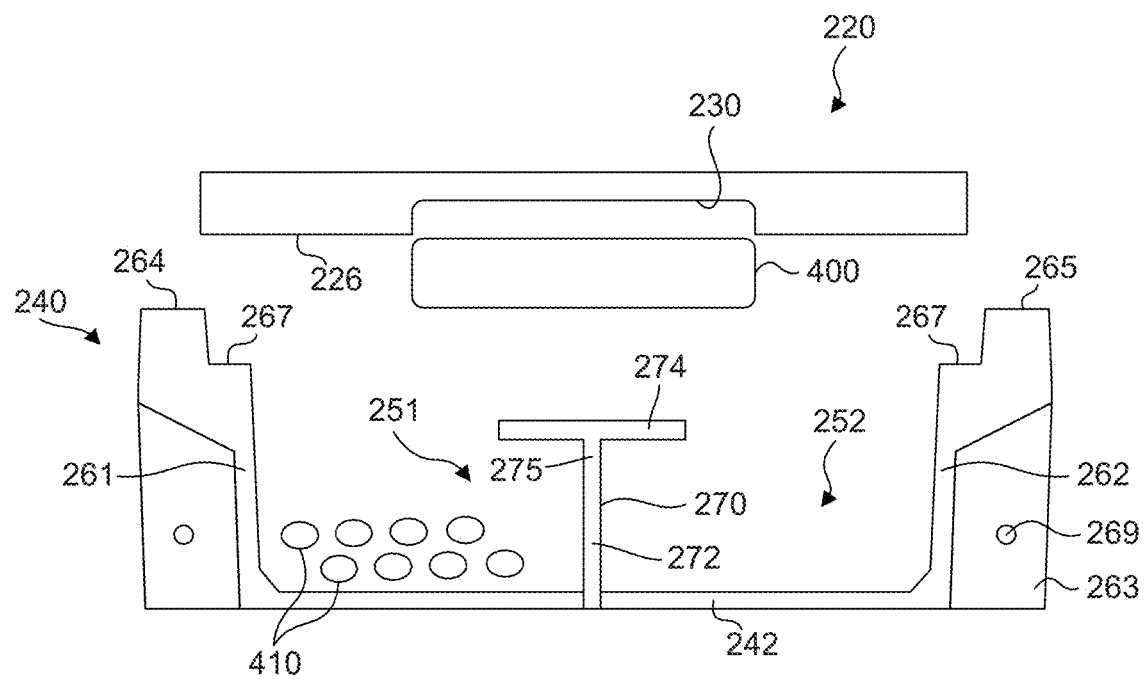
FIG. 7 shows a transverse cross sectional view of a trench and panel of a distribution system according to an embodiment.

Trench 240 may be configured to receive panel 220, as best shown in FIG. 7. Panel 220 is constructed the same as and has the same features as panel 120 discussed above. Panel 220 may be positioned at an upper end 264, 265 of trench 240 so as to define a storage area 250 below panel 220 and bounded by trench 240. In some embodiments, upper end 264, 265 of each sidewall 261, 262 of trench 240 may include a notch 267 configured to receive panel 220. Notch 267 serves to position panel 220 in a desired location with respect to trench 240. When panel 220 is positioned in notch 267 of upper ends 264, 265 of sidewalls 261, 262, upper surface 222 of panel 220 is flush with upper end 264, 265 of trench 240.

In some embodiments, trench 240 may further include a divider or partition 270 (see FIG. 7). Partition 270 may extend from base 242 of trench 240 so as to divide storage area 250 into a first storage area 251 and a second storage area 252. Partition 270 may extend perpendicularly from base 242 of trench 240. Partition 270 may extend along a longitudinal axis Z of trench 240 or parallel thereto. First storage area 251 may be used to store high voltage cables, whereas second storage area 252 may be used to storage low voltage cables. Partition 270 may shield components in a first storage area 251 from interference from high voltage components in second storage area 252. Partition 270 may be composed of the same material as trench 240 or the same material as panel 220. In some embodiments, partition 270 may be composed of a metal, such as aluminum or stainless steel, or partition 270 may include a plastic material. In some embodiments, first storage area 251 may store permanent cables or wireless networking components, while second storage area 252 may be used to store temporary cables and components. In some embodiments, partition 270 may include a first section 272 arranged perpendicularly to base 242 of trench 240, and a second section 274 arranged perpendicularly to an upper end 275 of first section 272. Thus, in such embodiments, partition 270 may have a cross sectional area that is T-shaped, as shown for example in FIG. 7. First section 272 of partition 270 may serve to separate first and second storage areas 251, 252, and second section 274 may serve as a support surface for a wireless networking component, such as a wireless access point 400. In this way, wireless networking component is stably supported within trench 240. Alternatively, second section 274 may contact a panel 220 secured within trench so as to support panel 220. In some embodiments, additional partitions 270 may be used to divide storage area into a third storage area, fourth storage area, etc.

Figure 8:
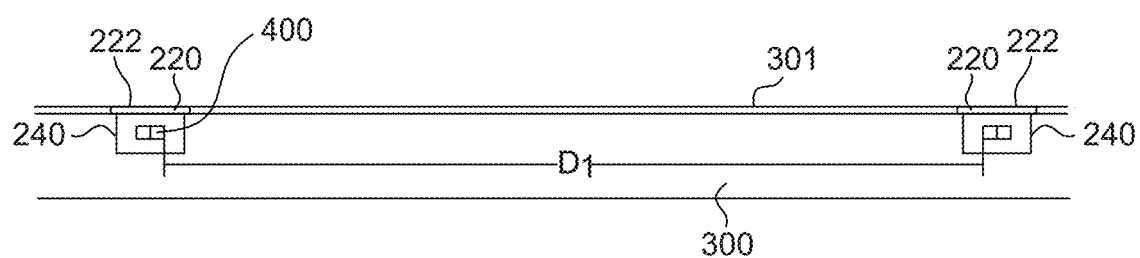
FIG. 8 shows a transverse cross sectional view of a distribution system according to an embodiment as installed in a support structure.

Trench 240 may be embedded in a support structure 300, as shown for example at FIG. 8. For example, support structure 300 may be constructed from concrete, and trenches 240 may be positioned in a desired location and surrounded by concrete. In this way, trenches 240 are permanently positioned within support structure 300 with storage area 250 positioned below a level of surface 301 of support structure 300. When panel 220 is positioned on trench 240 to enclose storage area 250, upper surface of panel 220 is coplanar with surface 301 of support structure 300. In this way, system 100 does not extend above a level of surface 301 of support structure 300, while providing storage area 250 for cables and wireless networking components.

Figure 9:
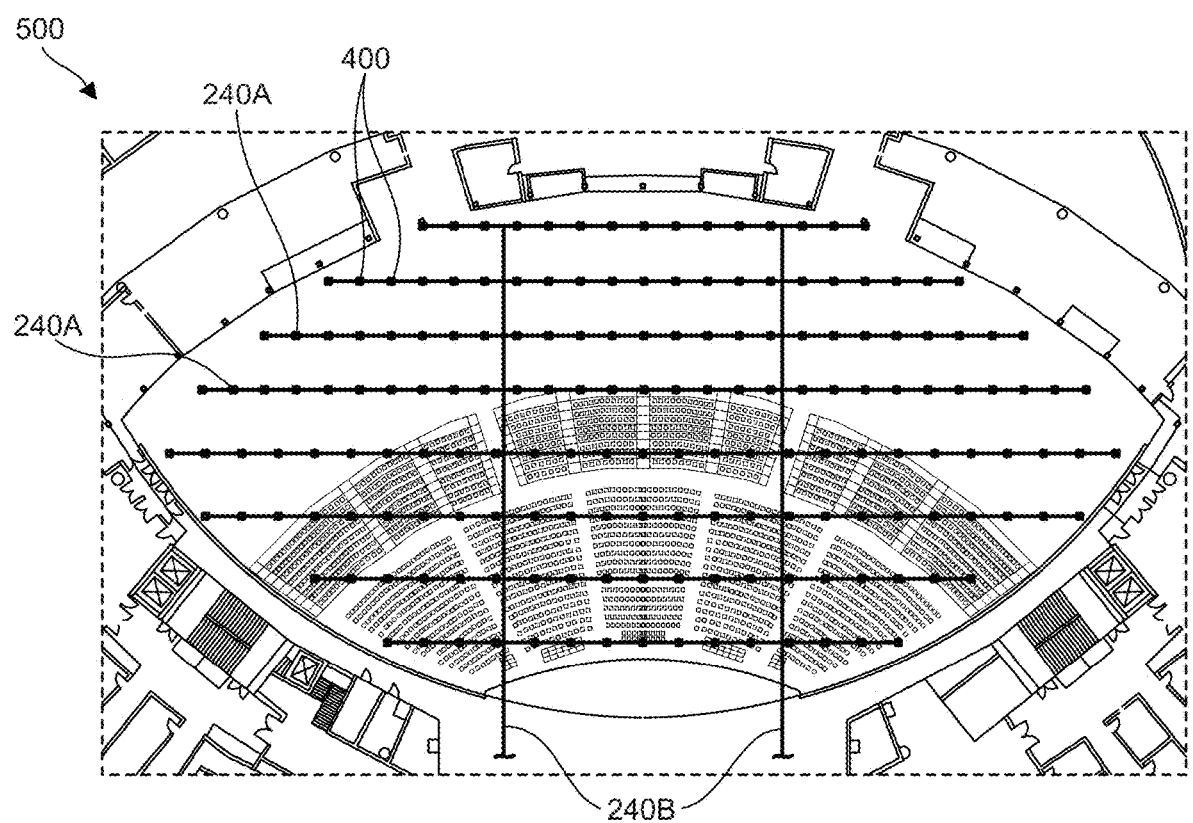
FIG. 9 shows a top-down view of a layout of a distribution system in a venue according to an embodiment.

Several trenches 240 may be arranged in a floor of a venue 500, as shown in FIG. 9. First trenches 240A may be linear and may be arranged in a spaced and parallel orientation. Trenches 240A may be spaced by a distance $D_1$, such as a distance of about 10 feet to about 50 feet, or of about 20 feet to about 40 feet (see FIG. 8). One or more second trenches 240B may be positioned perpendicularly to first trenches 240A so as to connect first trenches 240A and provide a path for running cables to desired areas of the venue via trenches 240A, 240B. Further, wireless access points 400 may be arranged at fixed intervals along trenches 240A, 240B. In some embodiments, as shown for example in FIG. 9, trenches 240 may be disposed below a seating area and/or below a non-seating area of the venue.

Some embodiments described herein relate to a distribution system 600 that includes a channel 610 configured to store and position wireless networking components, as shown in FIGS. 10-14. Channel 610 may be mounted in a seating area 700 and/or a non-seating area 800 of a venue. Seating area 700 may have a stepped configuration with a series of steps including an upper level 730, a vertical riser 720, and a lower level 710. Channel 610 may be mounted to a vertical riser 720 of seating area 700 and may extend along a length of vertical riser 720 and along a row of seating (see FIG. 11) so as to provide wireless networking components throughout seating area 700. In this way, electrical and telecommunications infrastructure can be provided in close proximity to patrons.

Figure 14:
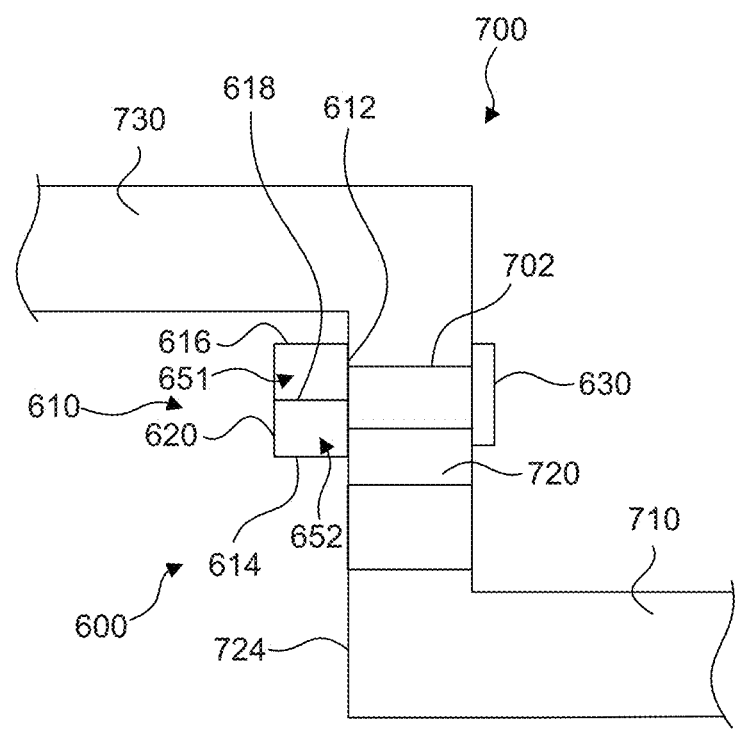
FIG. 14 shows a cross sectional view of a portion of the distribution system according to FIG. 13.

Channel 610 may include a base 612 mounted to vertical riser 720, a first sidewall 614 extending from base 612 and a second sidewall 616 extending from base 612, defining a storage area, as shown in FIG. 14. Channel 610 may be mounted to vertical riser 720 using any of various fastening techniques, such as by use of mechanical fasteners, including bolts or screws, or via bonding, welding, adhesives, or the like.

Figure 10:
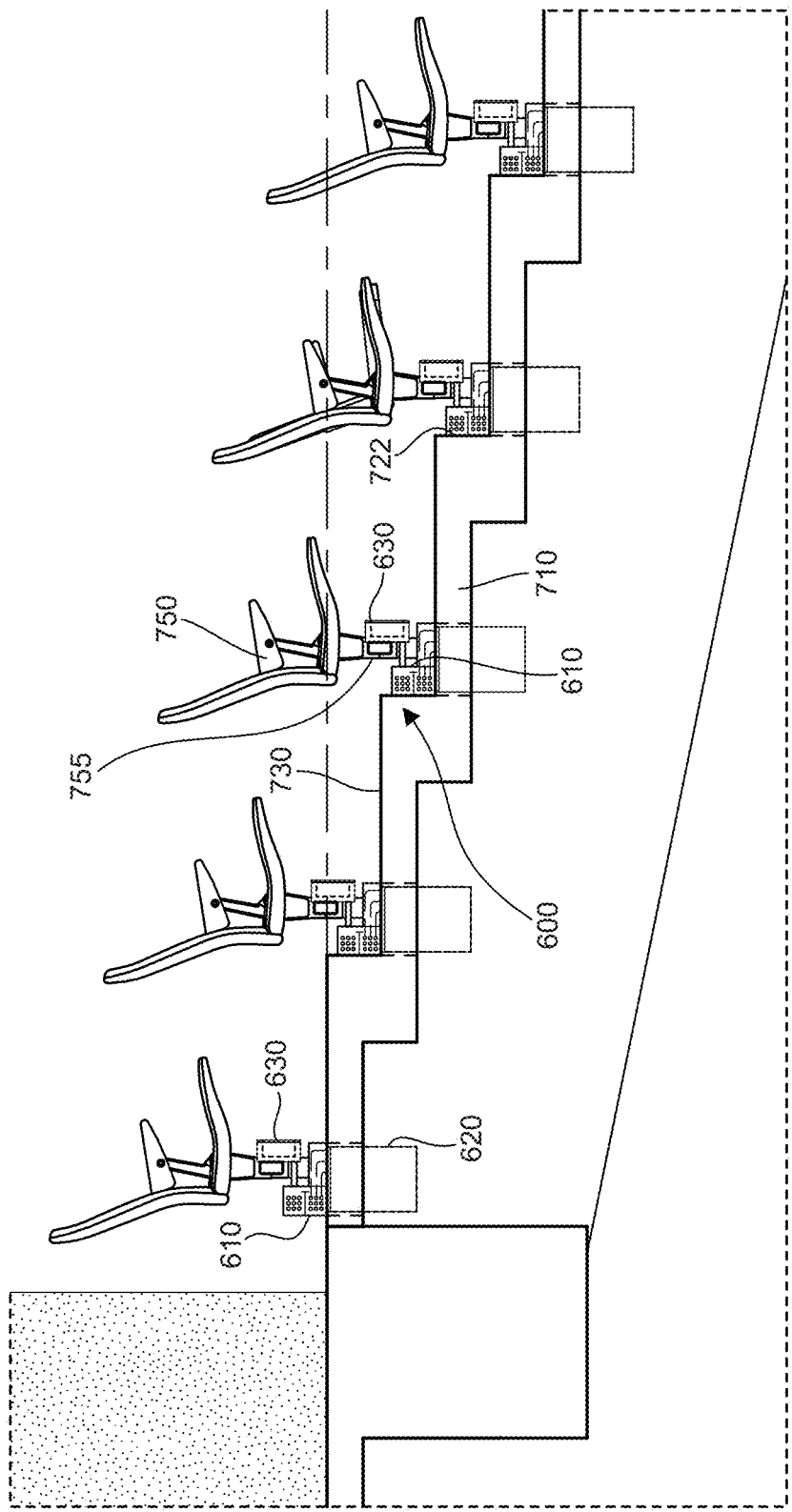
FIG. 10 shows a cross sectional view of a distribution system in a seating area of a venue according to an embodiment.
Figure 11:
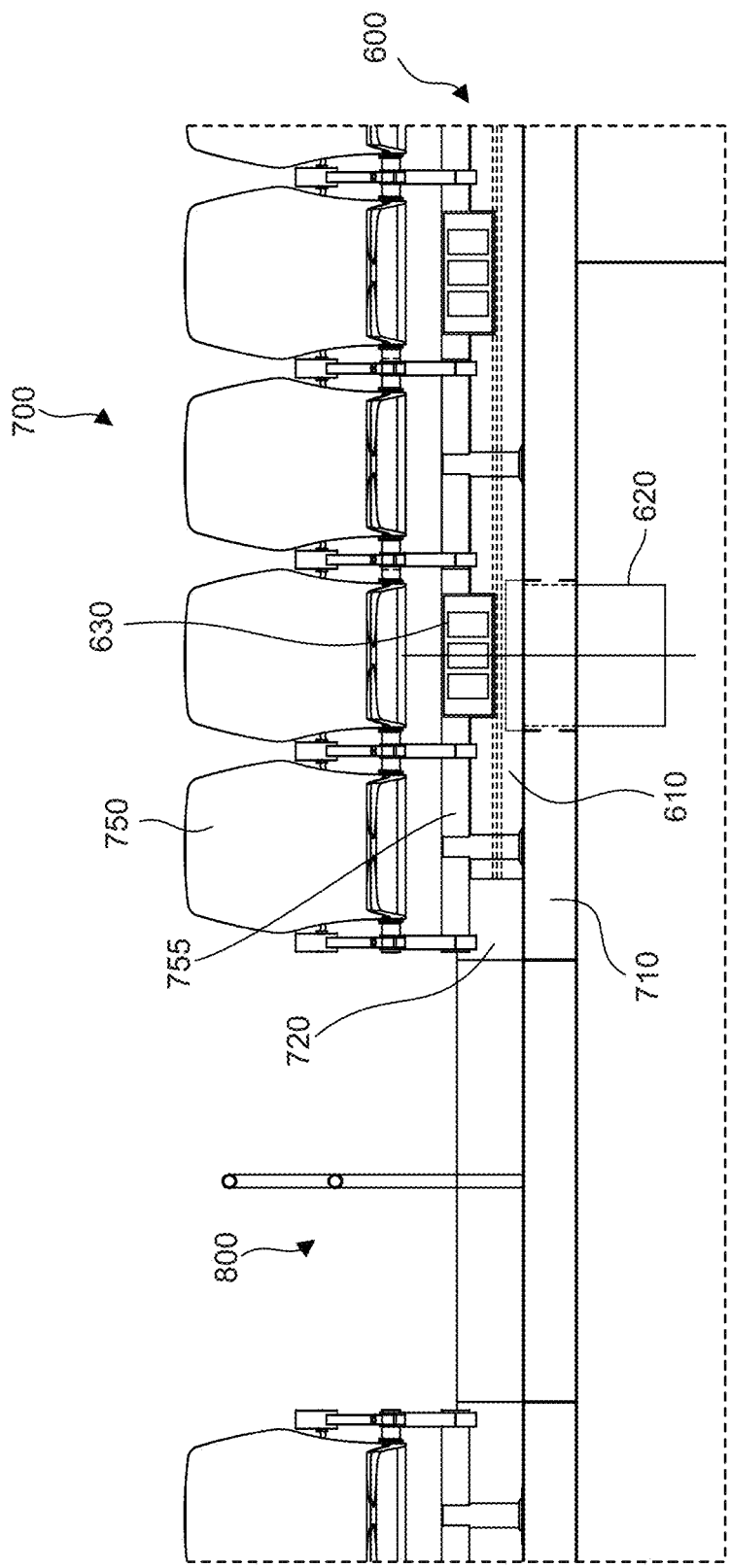
FIG. 11 shows a front view of the distribution system according to FIG. 10.

In some embodiments, as shown in FIGS. 10 and 11, a cover 620 may be removably securable to channel 610 so as to enclose the storage area defined by channel 610. Cover 620 may be securable to ends of first and second sidewall 614, 616 opposite base 612 of channel 610. Cover 620 may be removed so as to provide access to the electrical and telecommunications components within channel 610.

Channel 610 may be composed of a radio wave transparent material. In some embodiments, channel 610 may include a fiber reinforced polymer, such as fiberglass. However, in alternate embodiments, channel 610 may be composed of various materials including plastics or metals, such as aluminum.

In some embodiments, channel 610 may further include a partition 618 extending from base 612 so as to divide storage area of channel 610 into a first storage area 651 and a second storage area 652 (see FIG. 14), similar to partition 270 of trench 240 of FIG. 7. A first storage area 651 may be used to store electrical components while a second storage area 652 may be used to store telecommunications components. Electrical and telecommunications components may be connected to a faceplate 630 that includes ports or jacks for connection to the electrical and telecommunications infrastructure.

In some embodiments, channel 610 is mounted on a front surface 722 of vertical riser 720 in an area below a seat 750 in seating area 700, as shown in FIGS. 10 and 11. Channel 610 may extend along vertical riser 720, such as a long a row of seats 750 in seating area 700, as shown in FIG. 11, so as to provide wireless networking components throughout each row of seating area 700. Channel 610 may be positioned on a front surface 722 of vertical riser 720 in seating areas 700 in which there is a small height difference between upper level 730 and lower level 710, such as in a lower bowl of a stadium in which seating area 700 has a shallow or gradual slope. Faceplate 630 may be positioned on a portion of seat 750, such as on a beam 755 connecting seat 750 to lower level 710.

Figure 12:
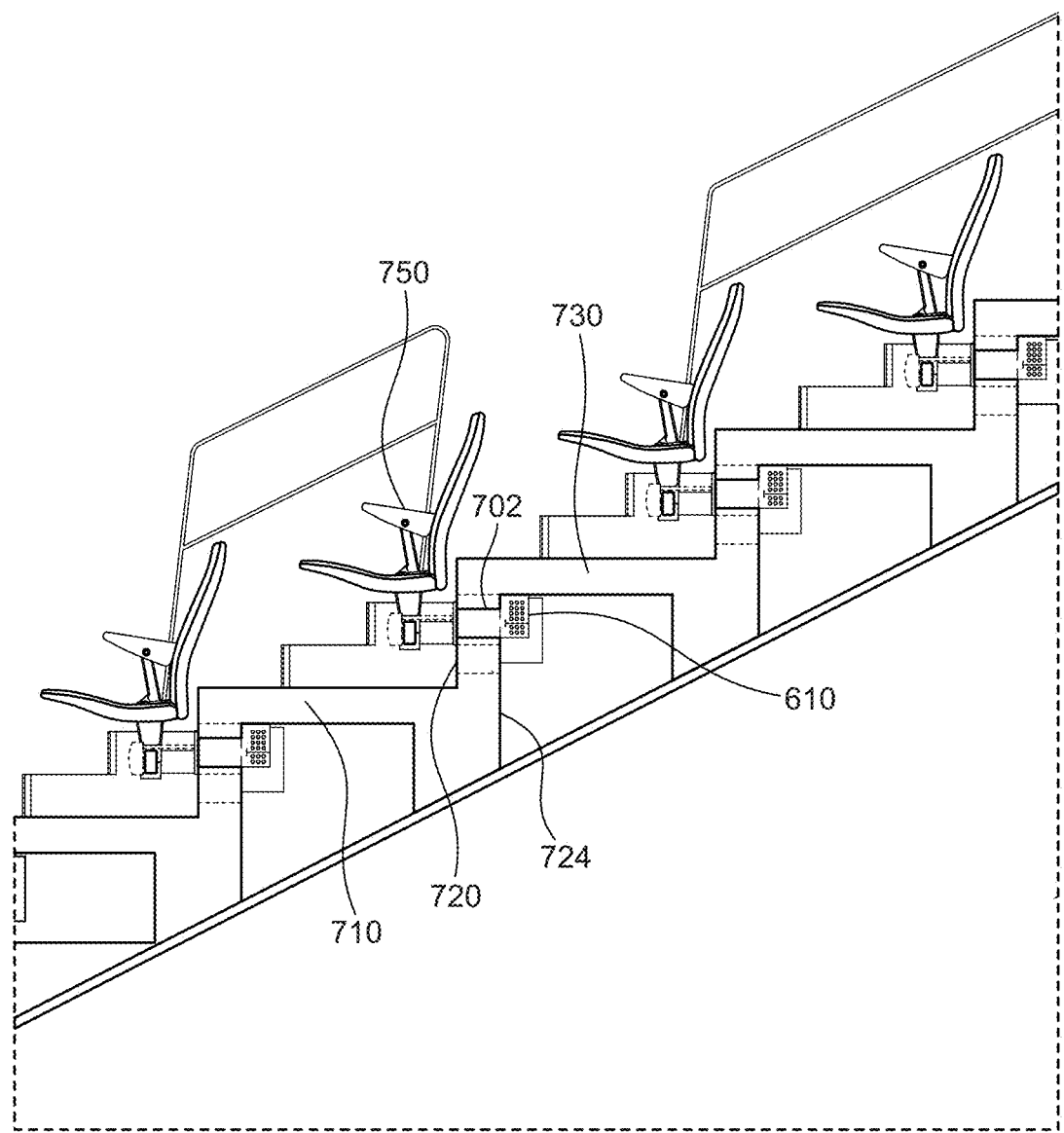
FIG. 12 shows a cross sectional view of a distribution system in a seating area of a venue according to an embodiment.
Figure 13:
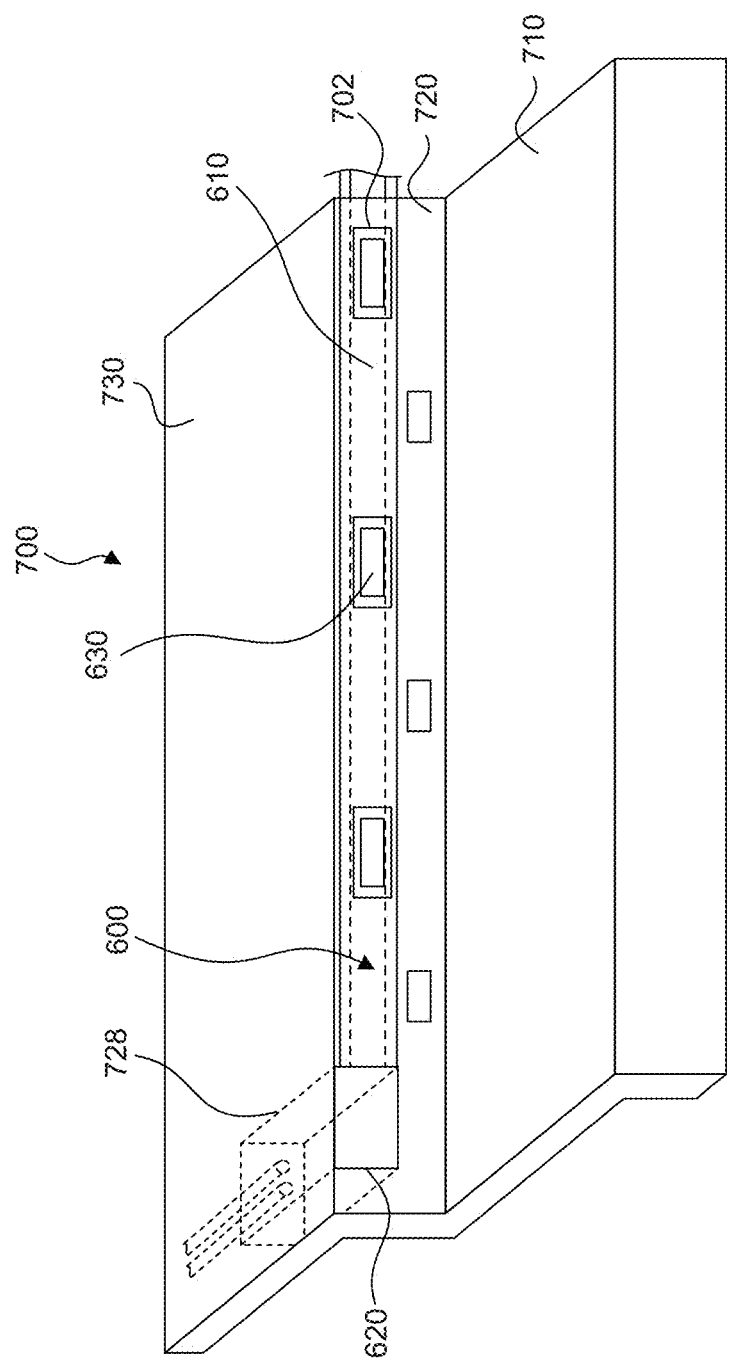
FIG. 13 shows a perspective view of a distribution system according to an embodiment.

In some embodiments, channel 610 may be secured to a rear surface 724 of vertical riser 720, as shown in FIGS. 12-14, such that channel 610 is below upper level 730 and behind vertical riser 720. Channel 610 may extend along a length of vertical riser, e.g., along a row of seats 750 of seating area 700 and/or non-seating area 800, as best shown in FIG. 12, so as to provide wireless networking components throughout seating area 700. Channel 610 may be secured to rear surface 724 of vertical riser 720 in seating areas 700 having a steep incline or slope, in which a height difference between upper level 730 and lower level 710 is relatively large, such as in an upper bowl or deck of a venue.

In some embodiments, seating area 700 may be constructed so as to define one or more openings 702 in vertical riser 720 so as to provide access to distribution system 600 and the wireless networking components therein, as shown in FIGS. 13 and 14. Each opening 702 may be covered by a faceplate 630 that provides connections to wireless networking components in channel 610.

Openings 702 in vertical riser 720 may be formed during construction of seating area 700. For example, as concrete is poured to form vertical riser 720 of seating area 700, a foam block may be positioned in locations at which it is desired to form an opening 702. Once the concrete hardens, the foam block may be removed so as to yield an opening 702 in a vertical riser 720 in the area occupied by the foam block. Similarly, seating area 700 may be formed with an enclosure 728 for receiving a distribution or junction box for connection to wireless networking components, as best shown in FIG. 13.

Figure 15:
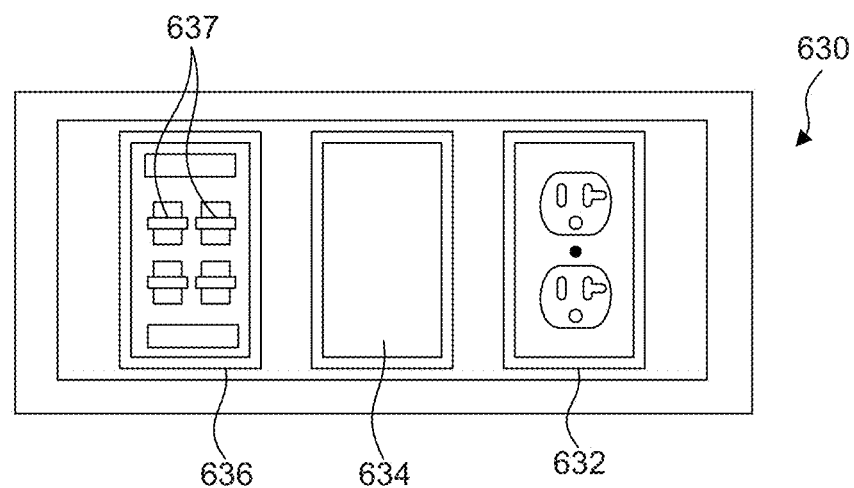
FIG. 15 shows a faceplate of the distribution system according to FIG. 13.

Each faceplate 630 may include one or more of an electrical panel 632, a blank panel 634, and/or an input panel 636, as shown in FIG. 15. Input panel 636 may include an interface having a number of ports or jacks 637, such as an Ethernet port for connecting telecommunications or data equipment. Blank panel 634 may provide the ability to retrofit faceplate 630 when new connections are developed by removing blank panel 634 and positioning a new panel having the desired connection ports or jacks. Electrical outlets of electrical panel 632 may be used for receiving conventional electrical cables for powering any of various devices.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A system for distributing wireless networking components in a venue, comprising:
    a plurality of panels defining a floor surface, wherein a first panel of the plurality of panels has a planar configuration with an upper surface opposite a lower surface, wherein the first panel comprises a material that is transparent to radio waves; and
    a storage space defined below the panel configured to store a wireless networking component.

2. The system of claim 1, wherein the material of the first panel comprises a fiber reinforced polymer.

3. The system of claim 1, wherein the first panel comprises a recess on the lower surface of the first panel, such that a thickness of the first panel at the recess is less than a thickness of a remainder of the first panel.

4. The system of claim 1, wherein the first panel comprises a reinforcement.

5. The system of claim 4, wherein the reinforcement comprises a metal bar.

6. The system of claim 4, wherein the reinforcement comprises a frame positioned at a perimeter of the first panel.

7. The system of claim 1, wherein the first panel comprises a dovetail at a perimeter of the first panel configured to connect the first panel to a second panel of the plurality of panels.

8. The system of claim 1, wherein the first panel comprises a seal disposed around a perimeter of the first panel.

9. The system of claim 1, wherein the plurality of panels are positioned in an edge-to-edge manner in a single plane.

10. The system of claim 1, wherein the first panel comprises a cutout to allow a cable to pass through the first panel from the storage space to an area above the first panel.

11. A flooring system for use with a pre-existing support structure, comprising:
    a plurality of panels defining a floor surface, wherein a first panel of the plurality of panels has a planar configuration with an upper surface opposite a lower surface, wherein the first panel comprises a material that is transparent to radio waves, and wherein the first panel comprises a recess on the lower surface of the first panel that is arranged symmetrically relative to an axis of the first panel such that a thickness of the first panel at the recess is less than a thickness of a remainder of the first panel; and
    a storage space defined below the panel configured to store a wireless networking component.

12. The system of claim 11, wherein the first panel is configured to withstand a weight of at least 15,000 lbs.

13. The system of claim 11, further comprising a riser removably secured within a receptacle in the lower surface of the first panel of the plurality of panels, wherein the riser is configured to support the first panel in an elevated position relative to a support surface.

14. The system of claim 13, wherein the first panel comprises a square or rectangular shape, and the riser is one of a plurality of risers removably secured to a lower surface of the first panel.

15. A flooring system for use with a pre-existing support structure, comprising:
    a plurality of panels defining a floor surface having an upper surface that is continuous with a surface of a pre-existing support structure, wherein a first panel of the plurality of panels has a planar configuration with an upper surface opposite a lower surface, wherein the first panel comprises a first material that is transparent to radio waves; and
    a trench comprising a base and a pair of opposing sidewalls defining a storage space for a wireless networking component, wherein the upper end of the trench is configured to removably receive the plurality of panels.

16. The system of claim 15, wherein the trench is embedded in the pre-existing support structure.

17. The system of claim 15, wherein when the first panel is received by the trench, the upper surface of the first panel is coplanar with the surface of the support structure.

18. The system of claim 15, wherein an upper end of each sidewall of the pair of opposing sidewalls comprises a notch configured to receive a portion of the first panel.

19. The system of claim 15, wherein the trench further comprises a partition configured to divide the storage space into a first storage space and a second storage space.

\* \* \* \* \*